Figures 1, 2:
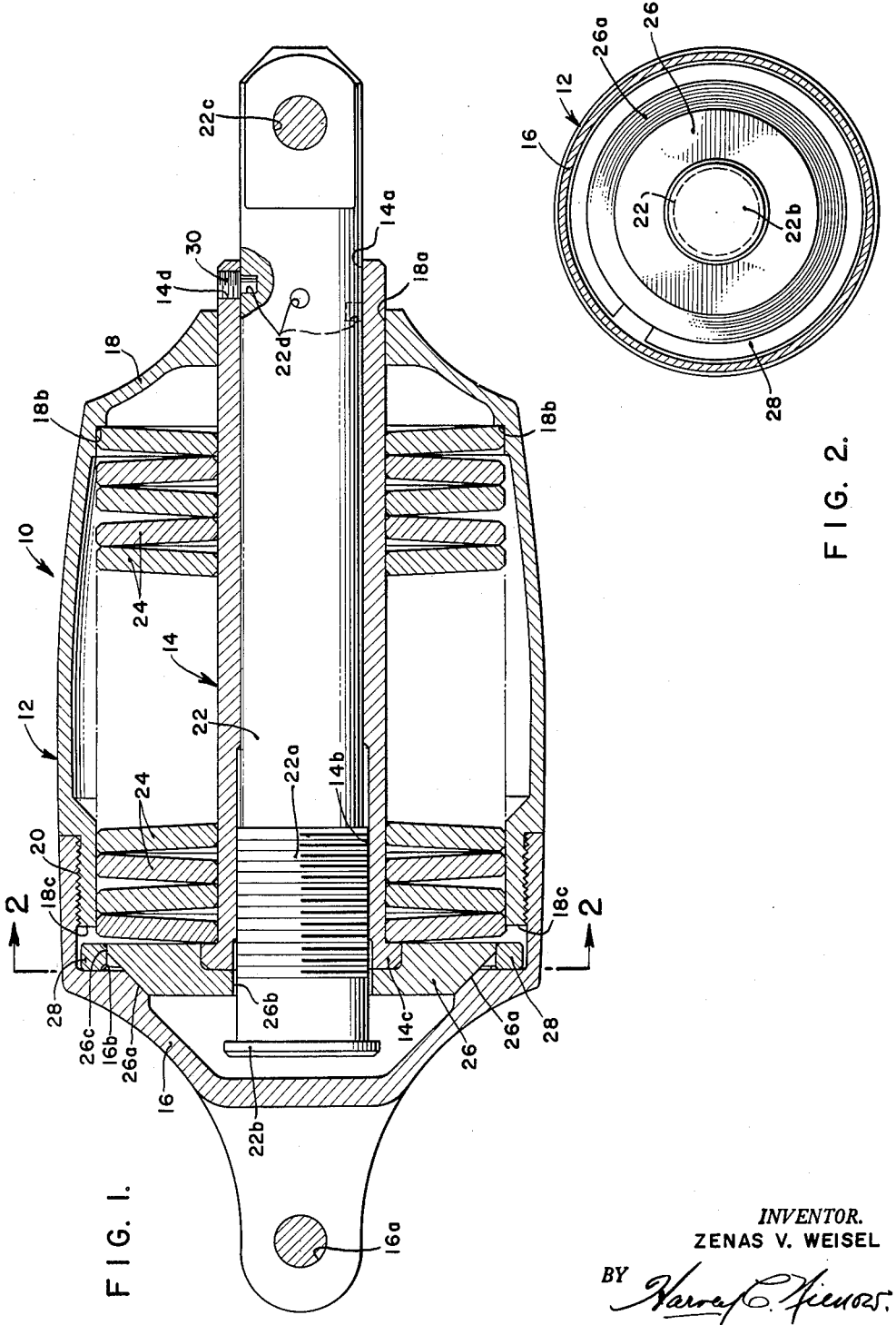

May 8, 1962     Z. V. WEISEL     3,033,154
INDICATING DEVICE

Filed Feb. 29, 1960     2 Sheets-Sheet 1

*INVENTOR.*
ZENAS V. WEISEL
BY
ATTORNEY.

United States Patent Office 3,033,154
Patented May 8, 1962

3,033,154
INDICATING DEVICE
Zenas V. Weisel, Los Angeles, Calif., assignor to Borg-Warner Corporation, Chicago, Ill., a corporation of Illinois
Filed Feb. 29, 1960, Ser. No. 11,721
15 Claims. (Cl. 116—67)

This invention relates to indicating devices generally, but more specifically, to means for indicating occurrences of a predetermined motion or force.

The present invention finds particular application in the field of oil well drilling wherein it is desirable to make up drill pipe, case or tubing by connecting together various sections having pipe threads. In so doing, it is preferable if not mandatory, to limit the amount of torque applied in tightening the threaded sections to insure that the threads are not damaged in any way. To this end, various types of devices have been employed to indicate when the maximum permissible torque has been applied to the threaded connections, and the present invention utilizes a unique structural arrangement for affording an audible signal to warn the operator when such maximum torque has been reached. As applied to oil well drilling, such torque indicating devices are frequently interposed between the holding tong and a stationary pipe, or between the power tong and the power applying equipment to indicate the resistance of the pipe to torsional movement due to the thread engagement in the coupling.

Although particularly well adapted for use in the oil well drilling industry, as will hereinafter become apparent, the present invention can also be utilized to afford indication of the occurrence of predetermined relative movement between two relatively movable parts. As will also appear, the energy used in affording the audible signal, as attributed above to the present invention, can be converted into affording any desired signal or indication to which the operator might be sensitive.

Therefore, it is an object of the present invention to provide a motion indicating device which affords an audible signal upon occurrence of predetermined relative movement between two parts.

Another object is to provide an indicator as characterized above which is automatically resettable upon reversal of such relative motion below such predetermined amount.

Another object is to provide an indicator as characterized above, including means for varying, as desired, the amount of motion necessary to effect the signal.

Another object is to provide an indicator as characterized above wherein a resilient element is self-biased into a given position and is released from such position upon occurrence of the predetermined condition, whereupon the self-biasing force of said element is released for use in effecting any desired signal or indication.

Another object is to provide an indicating device which is responsive to force, whereby application thereto of a predetermined force causes a signal to be given.

Another object is to provide a force indicator as characterized above which provides an audible signal upon occurrence of the predetermined amount of force.

Another object is to provide a force responsive indicator as characterized above which is automatically resettable upon a decrease in such force below the predetermined value.

Another object is to provide a force indicator as characterized above, including means for varying, as desired, the amount of force necessary to effect the signal.

Another object is to provide such as indicator wherein a snap ring is radially expanded to provide a force for retaining said snap ring in a given position on a given member, said given member being formed with an inclined surface for cooperation therewith by said snap ring upon occurrence of the predetermined condition, said inclined surface thereby converting the expansion force of said snap ring into an external force thereon.

Another object is to provide an indicating device as characterized above which is inexpensive to construct, operate and maintain, and which is simple, safe and reliable in operation.

Another object is to provide such an indicating device which is extremely rugged so as to withstand considerable abuse.

Figure 3:
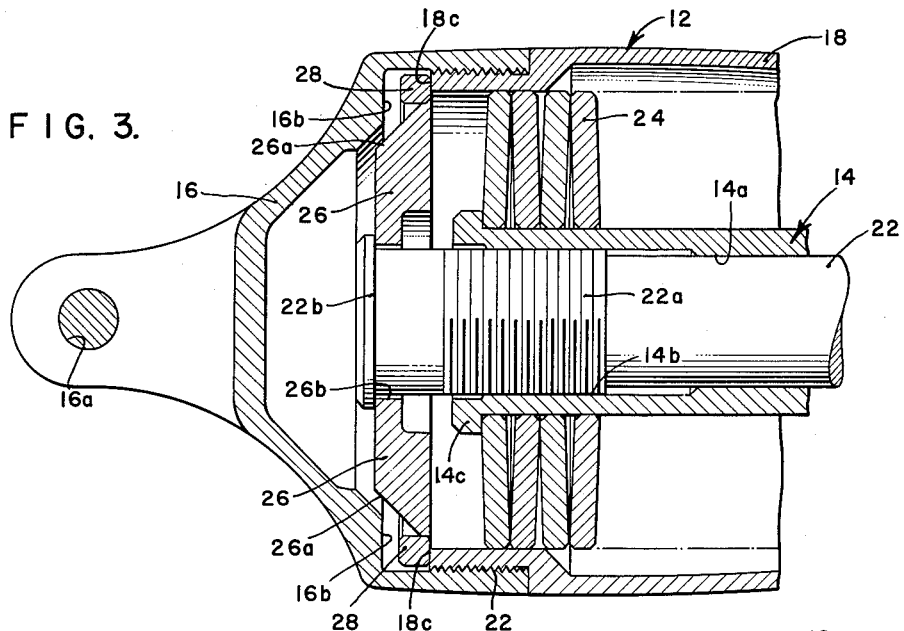
Figure 4:
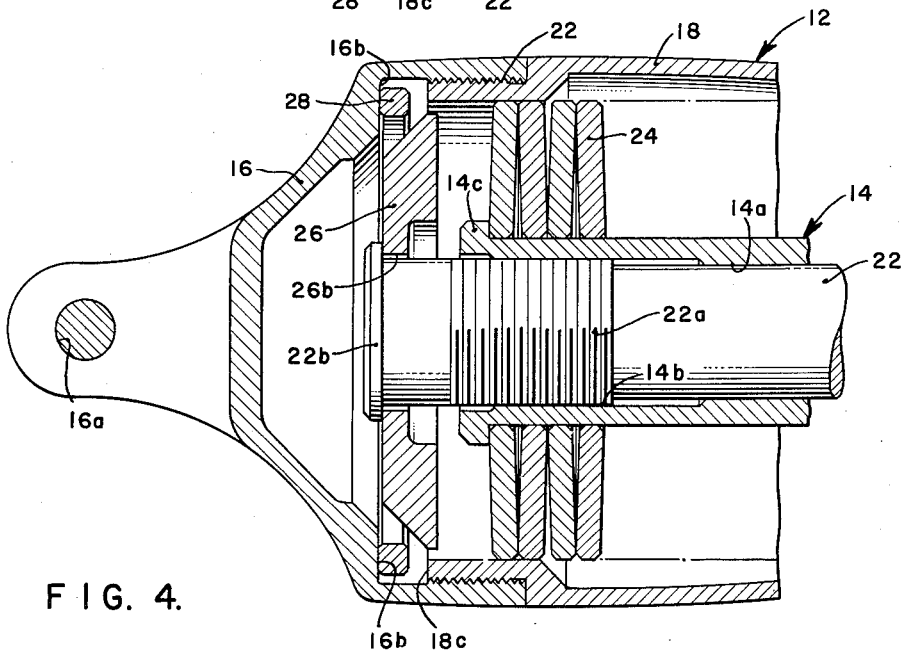

The novel features which I consider characteristic of my invention are set forth with particularity in the appended claims. The device itself, however, both as to its organization and mode of operation together with additional objects and advantages thereof will best be understood from the following description of specific embodiments when read in connection with the accompanying drawings, in which, FIG. 1 is a longitudinal sectional view taken along the axis of the indicating device, FIG. 2 is a transverse sectional view on a reduced scale taken substantially along line 2—2 of FIG. 1, FIG. 3 is a fragmentary longitudinal sectional view similar to FIG. 1 showing various parts of the indicating device in their position immediately preceding occurrence of the predetermined condition, and FIG. 4 is a fragmentary longitudinal sectional view similar to FIG. 1 showing various parts of the indicating device in their position upon occurrence of the predetermined condition.

Like characters indicate corresponding parts throughout the several views of the drawings.

Referring to FIG. 1 of the drawings, it shows the indicating device 10 as comprising a pair of relatively movable co-axially arranged frame members 12 and 14. Frame member 12 is formed of two generally cup-shaped members 16 and 18 which are threaded together as at 20 to provide a unitary structure. Cup-shaped member 18 is formed with a circular opening 18a through which frame member 14 is axially movable as will hereinafter become apparent.

Frame member 14 is provided with a through axial opening 14a one end of which is provided with internal screw threads 14b for cooperation with a shaft or rod 22 which is adjustably positioned within opening 14a of frame member 14. To provide such adjustability, shaft 22 is provided with external screw threads 22a which cooperate with the internal screw threads 14b formed in member 14.

Positioned within cup-shaped member 18 of frame member 12 is spring means 24 which may take the form of a helical spring or a belleville spring, as desired, to afford the requisite amount of force within the space available. Spring means 24 abuts against a ledge or abutment 18b formed in cup-shaped member 18, and encircles frame member 14 one end of which is formed with an annular shoulder 14c for engagement with spring means 24.

Positioned within cup-shaped member 16 of frame member 12 is a disc 26 which is formed with an inclined or beveled surface 26a and a through opening 26b, the latter of which enables disc 26 to loosely fit on shaft 22. The inclined surface 26a of disc 26 may be a frusto conical surface if desired. The end of shaft 22 adjacent disc 26 is provided with an annular shoulder 22b which will not pass through opening 26b in disc 26.

An energy storing element or snap ring 28 is positioned on and retained by disc 26 by virtue of the energy stored in element 28. That is, snap ring 28 is caused to engage a cylindrical surface 26c of disc 26 due to the energy created therein by radially expanding said ring to conform to the circumferential dimension of disc 26. This arrangement, of course, requires that snap ring 28 initially be somewhat smaller in size than the cylindrical surface 26c of disc 26.

Due to the manner in which cup-shaped members 16 and 18 are interconnected to provide frame member 12, an abutment 18c is afforded within member 16.

The indicating device 10 may be connected to a line to be subjected to a tensile force the occurrence of a predetermined value of which is to be indicated by device 10. Such connection can be accomplished by means of opening 16a formed in cup-shaped member 16 and opening 22c formed in shaft 22. Under these conditions, upon the application of tensile force to device 10, frame member 14 and shaft 22, acting as a unitary structure, are caused to move with respect to frame member 12 against the force of compression spring 24. Referring to FIG. 1, such movement causes shaft 22 and frame member 14 to move to the right, with respect to frame member 12, whereas disc 26 remains in its initial position as shaft 22 loosely slides through the opening 26b of disc 26. Such relative movement continues until the annular shoulder 22b of shaft 22 engages disc 26 whereupon further relative movement of frame member 14 with respect to frame member 12 causes said disc and snap ring 28 to be moved to the right, as shown in FIG. 1. Such motion continues with increasing tensile force applied to the line wherein device 10 is operable, until snap ring 28 engages abutment 18c as shown in FIG. 3 of the drawings. Further relative movement of frame members 12 and 14 causes disc 26 to be moved to the right whereupon snap ring 28 is ultimately moved from engagement with the cylindrical surface 26c of disc 26 and caused to cooperate with the conical surface 26a thereof.

Due to the fact that snap ring 28 is somewhat undersized as compared to the cylindrical surface 26c or outer dimension of disc 26, as soon as it is forcibly detached from such cylindrical surface it immediately contracts so as to attempt to engage conical surface 26a. The cooperation between snap ring 28 and conical surface 26a is such that the energy stored in snap ring 28 by virtue of its originally being expanded to fit onto disc 26 is converted into an external force applied to ring 28 and causing the same to be swiftly moved in an axial direction. Such movement causes snap ring 28 to sharply strike against an inner wall 16b of cup-shaped member 16. Such engagement affords an audible indication that the predetermined relative movement between frame members 12 and 14 or the predetermined force applied thereto has occurred. In addition to the audible signal afforded by snap ring 28 striking surface 16b of frame member 16, it has been noted that a further signal is afforded by virtue of engagement of the ends of snap ring 28 as the latter quickly returns to its relaxed position.

It will be noted that as ring 28 engages wall 16b of cup-shaped member 16, and as the free ends of ring 28 come together, said ring is free to vibrate so that the audible signal afforded thereby is not damped, but rather is permitted to slowly diminish or decay. Also, it is realized that the release of energy from snap ring 28 upon occurrence of the predetermined condition could be utilized to actuate any one of various types of signaling mechanisms, in which event the signal could be made to be visual and/or audible as desired.

In order to adjust the indicating device for indication of different values of tensile force applied to the line, it is merely necessary to threadedly adjust the position of shaft 22 within frame member 14. To accomplish this, there is provided a lock screw 30 within a threaded opening 14d formed in frame member 14. Lock screw 30 cooperates with shaft 22 such that when screw 30 is firmly anchored in place shaft 22 and frame member 14 are securely together. It may be desirable to provide shaft 22 with circumferentially spaced recesses or notches 22d for receiving lock screw 30 to insure that shaft 22 and frame member 14 are firmly joined together. By changing the position of shaft 22 within frame member 14, the compressive force of spring means 24 which prevails at the time snap ring 28 is detached from disc 26 is altered accordingly. In this manner the predetermined force to be indicated by device 10 may be readily changed.

It is contemplated within the purview of this invention that suitable cooperating indicia may be provided on shaft 22 and frame member 14 to facilitate adjustment of device 10 to the desired force to be indicated.

In order to provide the most desirable audible signal as a result of snap ring 28 contacting surface 16b of frame member 16, it may be advantageous to be able to adjust the position of disc 26 at the time snap ring 28 is disengaged therefrom. This may be accomplished by varying the extent to which body members 16 and 18 are engaged by virtue of the fastening threads shown at 20. If desired, a set screw may be used to firmly secure together such body members once the preferred relative positions thereof have been obtained.

Upon removal of the predetermined force indicated by device 10, spring means 24 forces disc 26 toward frame member 16b by virtue of the then abutting relation between disc 26 and the end of frame member 14. Thereupon, such spring force, which is established during initial assembly of the indicating device, causes the inclined or conical surface 26a of disc 26 to forcibly expand snap ring 28 so that the same is ultimately caused to seat itself on the cylindrical surface 26c of disc 26 due to the wedging action of conical surface 26a and frame member 16. In this manner, indicating device 10 is resettable automatically upon removal of the force being measured.

It is also realized that device 10 becomes a relative motion indicating device merely by the removal of spring means 24 from within cup-shaped member 18. That is, without spring means 24 the relative movement of frame members 12 and 14 to work against, detachment of snap ring 28 from disc 26 is dependent merely upon the relative position of frame members 12 and 14. Thus, if such frame members are initially caused to be in a certain relative position, an indication will be afforded of predetermined relative movement therebetween.

It is thus seen that applicant has provided a motion or force indicating device which is simple to operate and which is automatically reset upon removal of the predetermined condition.

Although I have shown and described certain specific embodiments of my invention, I am fully aware that many modifications thereof are possible. My invention, therefore, is not to be restricted except insofar as necessitated by the prior art and by the spirit of the appended claims.

I claim:

1. In an indicating device having a pair of relatively movable members, the combination therewith of, an energy storing element attached to one of said members by energy stored therein by expansion of said element in a direction different from the direction of movement of said members, and means on the other of said members engageable with said element upon predetermined relative movement of said members to detach said element causing said element to contract and thereby release the energy stored therein for use in affording indication of said predetermined relative movement.

2. In an indicating device having a pair of relatively movable members, the combination therewith of, an energy storing element attached to one of said members by energy stored therein by expansion of said element in a direction different from the direction of movement of said members, means on the other of said members engageable with said element upon predetermined relative movement of said members to detach said element, and means operable upon detachment of said element causing said element to contract to convert the energy stored therein into a signal of the occurrence of said predetermined relative movement of said members.

3. In an indicating device having a pair of relatively movable members, the combination therewith according to claim 2 wherein the means to convert the energy stored in said element into a signal is a conically shaped surface formed on said one of said members.

4. In an indicating device having a pair of relatively movable members, the combination therewith according to claim 3 wherein the energy storing element is a snap ring which is caused upon detachment to contract about the conical surface formed on said one member whereby said snap ring is caused to forcibly contact the other of said movable members to provide an audible signal.

5. In a force indicating device, the combination of, a pair of relatively movable members, biasing means tending to restrict relative movement between said members, an energy storing element attached to one of said members by energy stored therein by expansion of said element in a direction different from the direction of movement of said members, and means on the other of said members engageable with said element upon predetermined relative movement of said members against the force of said biasing means to detach said energy storing element from said one member causing said element to contract and thereby release the energy stored therein for indicating occurrence of the force required to effect such predetermined relative movement of said members.

6. In a force indicating device, the combination of, a pair of relatively movable frame members, biasing means operable in one direction and interposed between said frame members to resist relative movement therebetween, a resilient element self-biased into engagement with one of said members by expansion in a direction other than the direction of operability of said biasing means, and means on the other of said members engageable with said element upon predetermined relative movement of said members against the force of said biasing means to detach said resilient element from engagement with said one member and thereby release the self-biasing force of said element for indicating occurrence of the force required to effect such predetermined relative movement of the frame members.

7. In a force indicating device, the combination of, a pair of relatively movable frame members, spring means interposed between said frame members to resist relative movement therebetween, a snap ring radially expanded into engagement with one of said members, means on the other of said members engageable with said snap ring upon predetermined relative movement of said members against the force of said spring means to detach said snap ring from engagement with said one member, and means on said one frame member cooperable with said snap ring upon detachment thereof to cause the latter to forcibly contact the other of said frame members to thereby provide an audible signal of occurrence of the force required to effect said predetermined relative movement of the frame members.

8. In a force indicating device, the combination of, a pair of relatively movable frame members, biasing means interposed between said frame members to resist relative movement therebetween, a snap ring radially expanded into engagement with one of said members, and means on the other of said members engageable with said snap ring upon predetermined relative movement of said members against the force of said biasing means to detach said snap ring from engagement with said one member, said one frame member being formed with an inclined surface cooperable with said snap ring upon contraction thereof following detachment to create a force on said snap ring causing it to forcibly contact the other of said frame members to thereby provide an audible signal of occurrence of the force required to effect said predetermined relative movement of the frame members.

9. In a force indicating device, the combination of, relatively movable frame members, spring means operable in one direction and interposed between said frame members to resist relative movement therebetween, an intermediate member having an initial position adjacent a given surface of one of said frame members, a resilient element self-biased into engagement with said intermediate member by expansion in a direction other than the direction of operability of spring means, means on the other of said frame members to detach said element from engagement with said intermediate member upon movement of the latter from its initial position, means on said intermediate member operable upon detachment of said element to convert the self-biasing force thereof into a force thereon to cause said element to contact the said given surface of said one frame member as a signal, and lost motion means interconnecting said other frame member and said intermediate member to insure detachment of said element in proximity of said given surface despite the amount of relative movement of said frame members against the force of said spring means.

10. In a force indicating device, the combination of, relatively movable frame members, spring means interposed between said frame members to resist relative movement therebetween, an intermediate member having an initial position adjacent a given surface of one of said frame members, a snap ring radially expanded into engagement with said intermediate member, means on the other of said frame members to detach said snap ring from engagement with said intermediate member upon movement of the latter from its initial position, said intermediate member being formed with a conical surface engageable by said snap ring upon detachment thereof to convert the force of contraction thereof into a force on said snap ring to cause it to forcibly contact the said given surface of said one frame member as a signal, and lost motion means interconnecting said other frame member and said intermediate member to insure detachment of said element in proximity of said given surface despite the amount of relative movement of said frame members against the force of said spring means.

11. In an indicating device, the combination of, relatively axially movable frame members, an intermediate member having an initial position adjacent a surface of one of said frame members, a resilient element self-biased into engagement with said intermediate member by expansion of said element in a direction normal to said axial movement, means on the other of said frame members to detach said element from engagement with said intermediate member upon movement of the latter from its initial position, means on said intermediate member operable upon detachment of said element to convert the self-biasing force thereof into a force thereon to cause said element to contact the said surface of said one frame member as a signal, and lost motion means interconnecting said other frame member and said intermediate member to insure detachment of said element in proximity of said surface despite the amount of relative movement of said frame members to be indicated by said signal.

12. In a force indicating device, the combination of, relatively axially movable frame members, spring means interposed between said frame members to resist relative movement therebetween, an intermediate member having an initial position adjacent a surface of one of said frame members, a resilient element self-biased into engagement with said intermediate member by expansion of said element in a direction normal to said axial movement, means on the other of said frame members to detach said element from engagement with said intermediate member upon movement of the latter from its initial position, means on said intermediate member operable upon detachment of said element to convert the self-biasing force thereof into a force thereon to cause said element to contact the said surface of said one frame member as a signal, and adjustable lost motion means interconnecting said other frame member and said intermediate member to insure detachment of said element in proximity of said surface for any preadjusted amount of relative movement of said frame members against the force of said spring means.

13. In an indicating device, the combination of, relatively axially movable frame members, an intermediate member having an initial position adjacent a surface of one of said frame members, a resilient element self-biased into engagement with said intermediate member by expansion of said element in a direction normal to said axial movement, an abutment on the other of said frame members to cause said element to be disengaged from said intermediate member upon movement of the latter from its initial position, means on said intermediate member operable upon disengagement of said element to convert the self-biasing force thereof into a force thereon to cause said element to contact the said given surface of said one frame member as a signal, and lost motion means adjustably connected to said other frame member and engageable with said intermediate member in accordance with adjustment thereof to insure disengagement of said element in proximity of said surface for any preadjusted amount of relative movement of said frame members to be indicated by said signal.

14. In a force indicating device, the combination of, a pair of relatively movable members, spring means operable in one direction and interposed between said members to resist relative movement therebetween, an energy storing element attached to one of said members by energy stored therein by expansion thereof in a direction other than the direction of operation of said spring means, means on the other of said members engageable with said element upon predetermined relative movement of said members against the force of said spring means to detach said element from said one member and thereby release the energy stored therein for indicating occurrence of the force required to effect such predetermined relative movement of the frame members, and resetting means including means on said one member operable upon removal of said force to restore energy to said element for attachment to said one member for subsequent application of force to said device.

15. In a force indicating device, the combination according to claim 14 wherein the energy storing element is a snap ring radially expanded for attachment to said one of said members, and wherein the means on said one member included in said resetting means is a frusto conical portion formed on said one of said members whereby removal of said force causes said spring means to move said frusto conical portion toward said snap ring to expand the same for attachment to said one of said members to thereby effect resetting of the force indicating device.

References Cited in the file of this patent

UNITED STATES PATENTS 2,664,845    Rhodes ---------------- Jan. 5, 1954